(12) United States Patent
Wu

(10) Patent No.: US 11,054,177 B2
(45) Date of Patent: Jul. 6, 2021

(54) HYBRID HEAT PUMP SYSTEM

(71) Applicant: City University of Hong Kong, Kowloon (HK)

(72) Inventor: Wei Wu, Kowloon (HK)

(73) Assignee: City University of Hong Kong, Kowloon (HK)

( * ) Notice: Subject to any disclaimer, the term of this patent is extended or adjusted under 35 U.S.C. 154(b) by 70 days.

(21) Appl. No.: 16/440,232

(22) Filed: Jun. 13, 2019

(65) Prior Publication Data

US 2020/0393171 A1 Dec. 17, 2020

(51) Int. Cl.
*F25B 25/02* (2006.01)

(52) U.S. Cl.
CPC .................................. *F25B 25/02* (2013.01)

(58) Field of Classification Search
CPC ........ F25B 25/02; F25B 29/00; F25B 29/003; F25B 29/006; F25B 25/00
USPC ......................................................... 62/483
See application file for complete search history.

(56) References Cited

U.S. PATENT DOCUMENTS 4,031,712 A * 6/1977 Costello .................... F25B 1/00
62/483
4,285,211 A * 8/1981 Clark .................... F25B 27/007
62/335

* cited by examiner

*Primary Examiner* — Steve S Tanenbaum
(74) *Attorney, Agent, or Firm* — Renner Kenner Greive Bobak Taylor & Weber

(57) ABSTRACT

A system and a method for a hybrid heat pump system including first compression means operable to form a refrigerant in vapor form and increases the pressure of the refrigerant vapor; condensing means arranged to receive the pressurized vapor and condenses the vapor under pressure to a liquid; pressure reduction means through which the liquid refrigerant leaving the condensing means passes to reduce the pressure of the liquid to form a mixture of liquid and vapor refrigerant; evaporator means arranged to receive the mixture of liquid and vapor refrigerant that passes through the pressure reduction means to evaporate the remaining liquid to form additional refrigerant vapor; second compression means including an inlet port and two, first and second outlet ports and operable to: receive the refrigerant vapor from the evaporator means through the inlet port; increase the pressure thereof; and pass at least a portion of the refrigerant vapor to at least one of the condensing means and the first compression means through the first and second outlet ports respectively; and a conduit operable to pass at least one of the refrigerant vapor leaving the evaporator means and the refrigerant vapor leaving the second compression means to the first compression means.

9 Claims, 8 Drawing Sheets

HYBRID HEAT PUMP SYSTEM

FIELD OF INVENTION

The present invention relates to a hybrid heat pump system, and more particularly, to a hybrid absorption-compression heat pump system with refrigerant release for use in cooling and heating.

BACKGROUND

Heat pump technologies are widely used for building and industrial energy saving due to the high efficiencies in space cooling, space heating, water heating, drying and industrial processing. The most widely used heat pumps include the electrically-driven vapor-compression heat pump and the thermally-driven heat pump.

SUMMARY INVENTION

In accordance with a first aspect of the present invention, there is provided a hybrid heat pump system comprising:
  first compression means operable to form a refrigerant in vapor form and increases the pressure of the refrigerant vapor;
  condensing means arranged to receive the pressurized vapor and condenses the vapor under pressure to a liquid;
  pressure reduction means through which the liquid refrigerant leaving the condensing means passes to reduce the pressure of the liquid to form a mixture of liquid and vapor refrigerant;
  evaporator means arranged to receive the mixture of liquid and vapor refrigerant that passes through the pressure reduction means to evaporate the remaining liquid to form additional refrigerant vapor;
  second compression means including an inlet port and two, first and second outlet ports and operable to:
    receive the refrigerant vapor from the evaporator means through the inlet port;
    increase the pressure thereof; and
    pass at least a portion of the refrigerant vapor to at least one of the condensing means and the first compression means through the first and second outlet ports respectively; and
  a conduit operable to pass at least one of the refrigerant vapor leaving the evaporator means and the refrigerant vapor leaving the second compression means to the first compression means.

In an embodiment of the first aspect, the second compression means further includes a release-type compressor for releasing at least a portion of the refrigerant vapor to the first compression means from the second compression means.

In an embodiment of the first aspect, the second compression means further includes a two-stage compressor, whereby at least a portion of the refrigerant vapor leaving the first stage is released to the first compression means and the remaining portion of the refrigerant vapor is passed to the second stage.

In an embodiment of the first aspect, the second compression means further includes two, first and second serially-connected compressors, whereby at least a portion of the refrigerant vapor leaving the first compressor is released to the first compression means and the remaining portion of the refrigerant vapor is passed to the second compressor.

In an embodiment of the first aspect, the second compression means further includes a dual-cylinder compressor for each receiving and compressing a portion of the refrigerant vapor from the evaporator means individually and passing to the first compression means and condensing means respectively.

In an embodiment of the first aspect, the second compression means further includes two, first and second parallelly-connected compressors for each receiving and compressing a portion of the refrigerant vapor from the evaporator means individually and passing to the first compression means and condensing means respectively.

In an embodiment of the first aspect, the first compression means further includes:
  an absorber that forms a mixture of a refrigerant and an absorbent; and a generator that receives the mixture from the absorber and heats the mixture to separate refrigerant, in vapor form, from the absorbent.

In an embodiment of the first aspect, the pressure of the refrigerant vapor from the evaporator means is increased by the second compression means, thereby increasing the absorption pressure at the absorber of the first compression means.

In an embodiment of the first aspect, the pressure at the first outlet port is higher than that at the second outlet port and the inlet port, and the pressure at the second outlet port is higher than that at the inlet port.

In an embodiment of the first aspect, the refrigerant vapor leaving the evaporator means is received and pressurized by the second compression means, and a portion of and another portion of the refrigerant vapor are each subsequently received by the condensing means and the first compression means respectively.

In an embodiment of the first aspect, a portion of the refrigerant vapor leaving the evaporator means is received and pressurized by the second compression means and subsequently received and condensed by the condensing means, and another portion of the refrigerant vapor leaving the evaporator means is received by the first compression means.

In an embodiment of the first aspect, the first compression means is activated and the second compression means is deactivated, whereby the refrigerant vapor leaving the evaporator means is received by the first compression means and subsequently received and condensed by the condensing means.

In an embodiment of the first aspect, the first compression means is deactivated and the second compression means is activated, whereby the refrigerant vapor leaving the evaporator means is received and pressurized by the second compression means and subsequently received and condensed by the condensing means.

In an embodiment of the first aspect, the fluid communication between the evaporator means and the first compression means is manipulated by a first valve and the fluid communication between the first and second compression means is manipulated by a second valve.

In an embodiment of the first aspect, the second compression means includes at least one of reciprocating compressor, rolling compressor, scroll compressor, screw compressor, and centrifugal compressor.

BRIEF DESCRIPTION OF DRAWINGS

Embodiments of the present invention will now be described, by way of example, with reference to the accompanying drawings in which.

DETAILED DESCRIPTION

Figure 1:
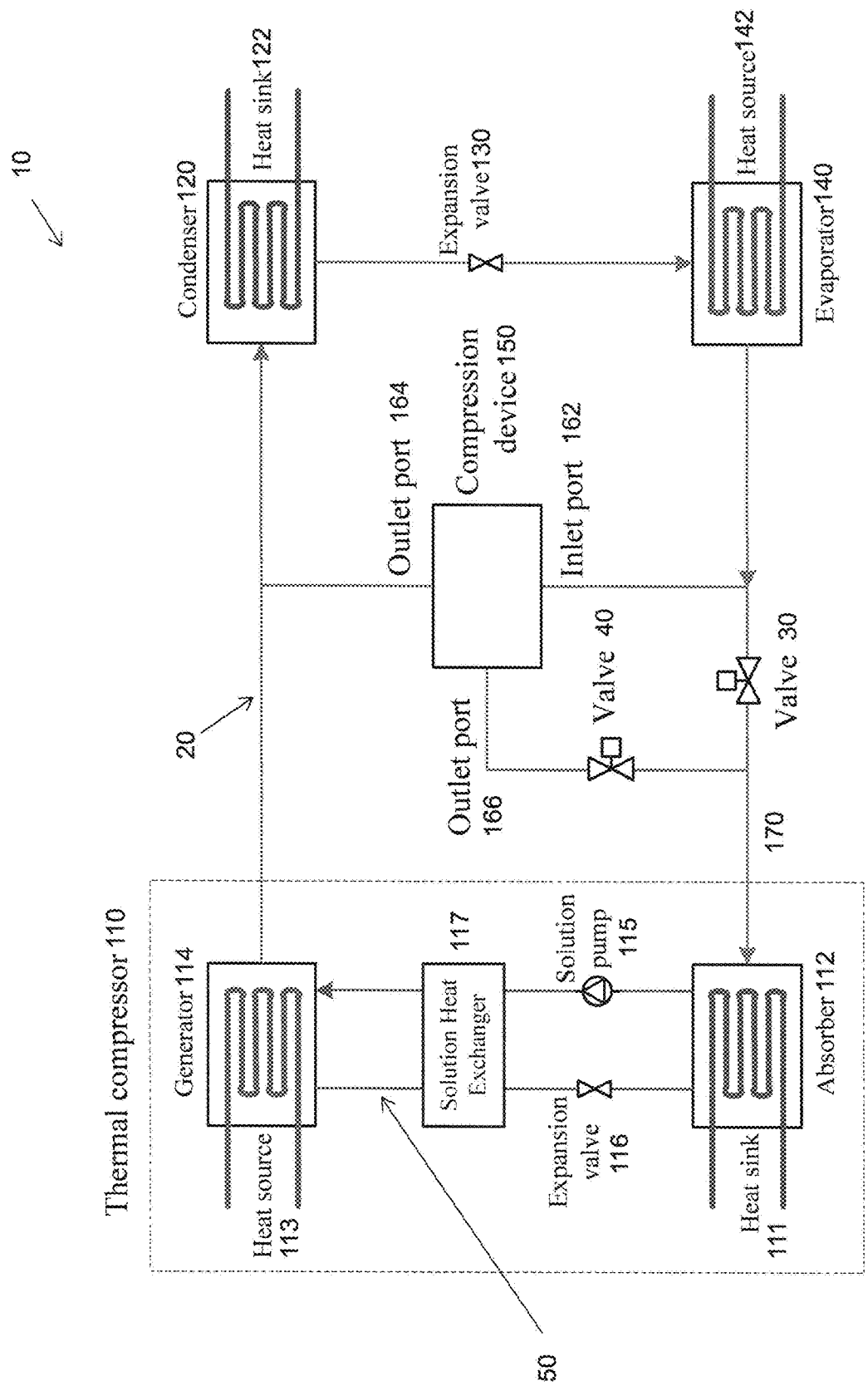
FIG. 1 is a schematic diagram of the hybrid absorption-compression heat pump with refrigerant release in one embodiment of the invention.

Without wishing to be bound by theories, the inventors, through their own researches, trials and experiments, have devised that the direct combination of the absorption cycle and the compression cycle can combine the advantages of both cycles, but the complex configuration increases the system cost.

To reduce the complexity and cost of the system, it's better to use the hybrid absorption-compression heat pump, in which the compression sub-cycle and the absorption sub-cycle share several main components including condenser, expansion valve and evaporator. However, there is still remaining problems, i.e. the absorption sub-cycle yields deteriorated performance or even cannot work under lower driving temperatures, lower evaporating temperatures and higher heat sink temperatures.

To address these problems, a novel hybrid absorption-compression heat pump with refrigerant release is invented. A compression device with a mid-pressure outlet port is used for the compression sub-cycle, while the vapor refrigerant entering the absorption sub-cycle is released from the mid-pressure port of the compressor instead of coming from the shared evaporator directly. Without the new configuration, the absorbing pressure equals the evaporating pressure; with the compression in the compressor, the absorbing pressure is boosted and the absorption process is strengthened. Since the required pressure lift ratio is small for the absorption sub-cycle, the refrigerant is released from the mid-pressure port.

The novel heat pump can operate in various modes:

(1) Combined absorption-compression mode. The design proportions of the compression sub-cycle and the absorption sub-cycle can be adjusted by the mid-pressure outlet port to accommodate the supply-side capacity profiles and demand-side load profiles, to maximize primary energy efficiencies, to minimize heat pump oversizing, or to reach annual rejection-and-extraction heat balance.

(2) Single compression mode with the absorption sub-cycle bypassed. This mode can be used when the thermal energy (from solar source, geothermal source, waste source, fossil fuel, etc.) is not available or not preferred, with the system powered by electricity from the grid or by mechanical energy from the fuel engine.

(3) Single absorption mode with the compression sub-cycle bypassed. This mode can be used when the electrical energy or mechanical energy is not available or not preferred.

In addition, the hybrid absorption-compression cycle includes the cycles with and without refrigerant release. These modes can be operated alternatively depending on the actual situations.

Referring to FIGS. 1 to 8, there is provided a hybrid heat pump system 10 comprising: first compression means 110 operable to form a refrigerant 20 in vapor form and increases the pressure of the refrigerant vapour 20, condensing means 120 arranged to receive the pressurized vapor 20 and condenses the vapor 20 under pressure to a liquid 20, pressure reduction means 130 through which the liquid refrigerant 20 leaving the condensing means 120 passes to reduce the pressure of the liquid 20 to form a mixture of liquid and vapor refrigerant 20, evaporator means 140 arranged to receive the mixture of liquid and vapor refrigerant 20 that passes through the pressure reduction means 130 to evaporate the remaining liquid 20 to form additional refrigerant vapour 20, second compression means 150 including an inlet port 162 and two, first and second outlet ports 164, 166 and operable to receive the refrigerant vapour 20 from the evaporator means 140 through the inlet port 162, increase the pressure thereof, and pass at least a portion of the refrigerant vapor 20 to at least one of the condensing means 120 and the first compression means 110 through the first and second outlet ports 164, 166 respectively, and a conduit 170 operable to pass at least one of the refrigerant vapour 20 leaving the evaporator means 140 and the refrigerant vapour 20 leaving the second compression means 150 to the first compression means 110.

The overall configuration of the hybrid heat pump system 10 is depicted in FIG. 1. Essentially, the hybrid heat pump system 10 includes first compression means 110, condensing means 120, pressure reduction means 130 and evaporator means 140, and second compression means 150 through which a refrigerant 20 is circulated in cycles.

The condensing means 120 is in fluid communication with a heat sink 122 for cooling the refrigerant 20 before entering the pressure reduction means 130. The evaporator means 140 is in fluid communication with a heat source 142 for heating the refrigerant 20 leaving the pressure reduction means 130. There is also provided a conduit 170 operable to pass a portion of the refrigerant vapour 20 leaving the evaporator means 140 to the first compression means 110.

The first and second compression means 110 and 150 are connected in parallel configuration with and share the condensing means 120, the pressure reduction means 130 and the evaporator means 140, thereby forming a hybrid vapor compression-absorption cycle with a compression sub-cycle driven by the compression device 150 and an absorption sub-cycle driven by the thermal compressor 110.

Preferably, the first compression means 110 may be a thermal compressor and further includes an absorber 112 for forming a mixture of the refrigerant 20 and a solution 50 i.e. an absorbent. The generator 114 receives the mixture from the absorber 112 and heats the mixture to separate refrigerant 20, in vapor form, from the absorbent 50. The absorber 112 is in fluid communication with a heat sink 111 for cooling the mixture and the generator 114 is in fluid communication with a heat source 113 for heating the mixture respectively. The first compression means 110 further includes a solution pump 115 for increasing the pressure of the mixture and pumping the mixture to the generator 114, and an expansion valve 116 for reducing the pressure of the mixture. There is further provided a solution heat exchanger 117 which transfers some heat from the mixture leaving the generator 114 to the mixture leaving the pump115. Finally, the mixture leaving the generator 114 is throttled by the expansion valve 116 to the absorber pressure.

Preferably, the second compression means 150 includes an inlet port 162 at a low pressure and two outlet ports 164, 166. The second compression means 150 may be in fluid communication with the evaporator means 140 through inlet port 162 at the upstream and in fluid communication with the condensing means 120 and the absorber 112 through the first and second outlet ports 164, 166 respectively at the downstream. The absorber 112 may also be in fluid communication with the evaporator means 140 directly. The inlet port 162 is at a low pressure, the first outlet port 164 is at a high pressure, and the second outlet port 166 is at a medium pressure respectively.

Advantageously, the refrigerant 20 from the mid-pressure port 166 of the compression device 150 instead of the refrigerant 20 from the evaporator 140 flows into the absorber 112. Under increased absorption pressure (medium pressure versus low pressure) at the absorber 112 of the first compression means 110, the absorption sub-cycle could be driven by lower-temperature heat sources 113, as well as work under lower evaporating temperatures and higher heat sink temperatures.

The pressure of the refrigerant vapor from the evaporator means 140 is increased by the second compression means 150, thereby increasing the absorption pressure at the absorber 112 of the first compression means 110. The refrigerant 20 from the compression device 150 divides into two streams, with one leaving from the first outlet port 164 and flowing into the condenser 120 and the other leaving from the second outlet port 166 and flowing into the absorber 112 of the absorption sub-cycle. In particular, the low-pressure refrigerant from the first inlet port 162 is first pressurized to mid-pressure, and then a portion of the mid-pressure refrigerant is discharged at the second outlet port 166. Then, the remaining mid-pressure refrigerant is further pressurized to high-pressure and discharged at the first outlet port 164. There is also provided two, first and second valves 30, 40 for regulating the flow of the refrigerant 20 from the evaporator 140 to the absorber 112, thereby operating the heat pump system 10 at different modes. The fluid communication between the evaporator means 140 and the absorber 112 of the first compression means 110 is manipulated by the first valve 30. The fluid communication between the absorber 112 of the first compression means 110 and the second outlet port 166 of the second compression means 150 is manipulated by the second valve 40.

The operating mode can be switched depending on the actual operating conditions. By switching valve 30 and valve 40, the novel heat pump can operate at single absorption cycle, single compression cycle, and hybrid absorption-compression cycle. The hybrid absorption-compression cycle includes the cycles with and without refrigerant release. These modes can be operated alternatively depending on the actual situations.

Figure 5:
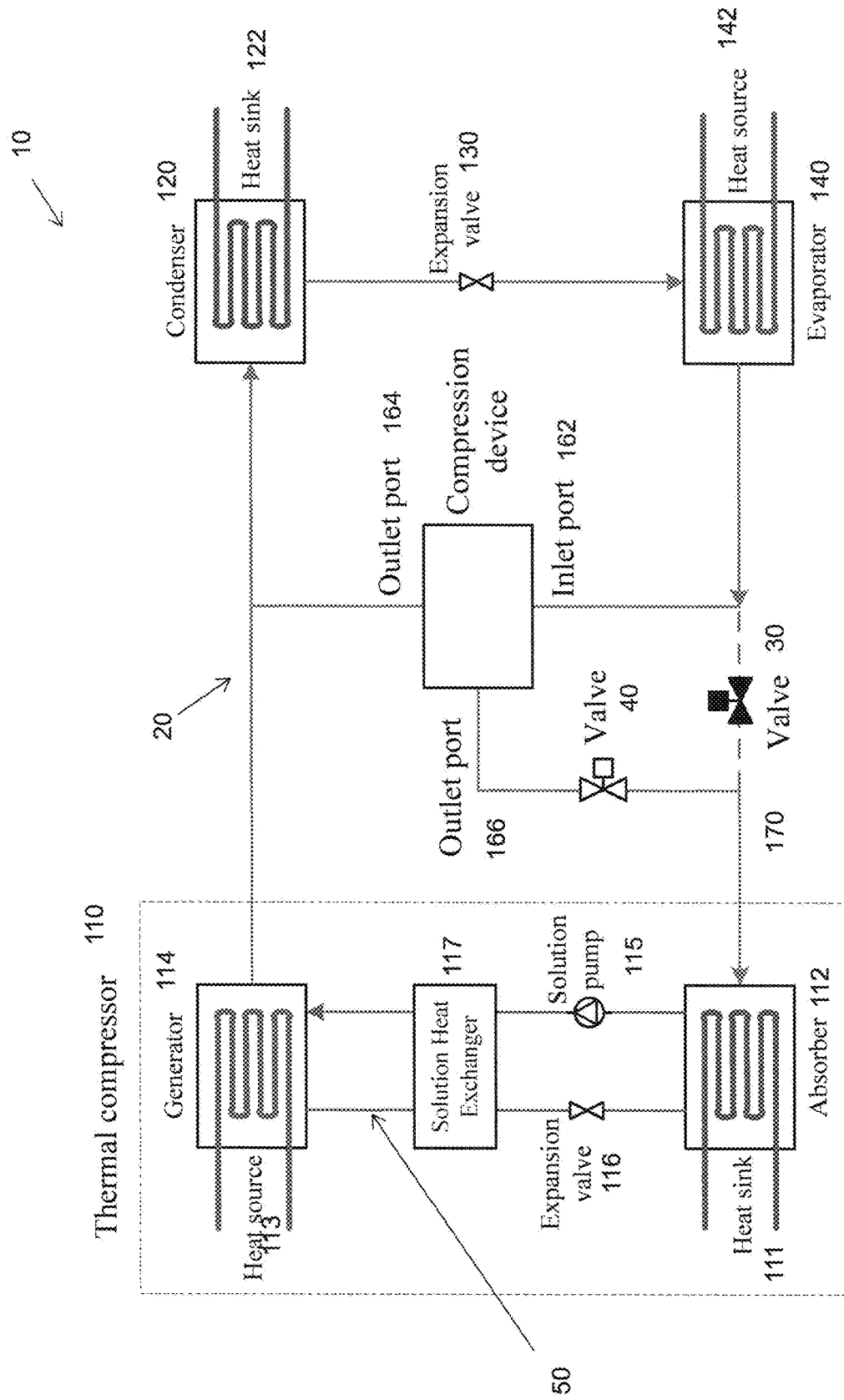
FIG. 5 is a schematic diagram of the hybrid absorption-compression heat pump of FIG. 1 operated in hybrid absorption-compression cycle mode with refrigerant release.
Figure 6:
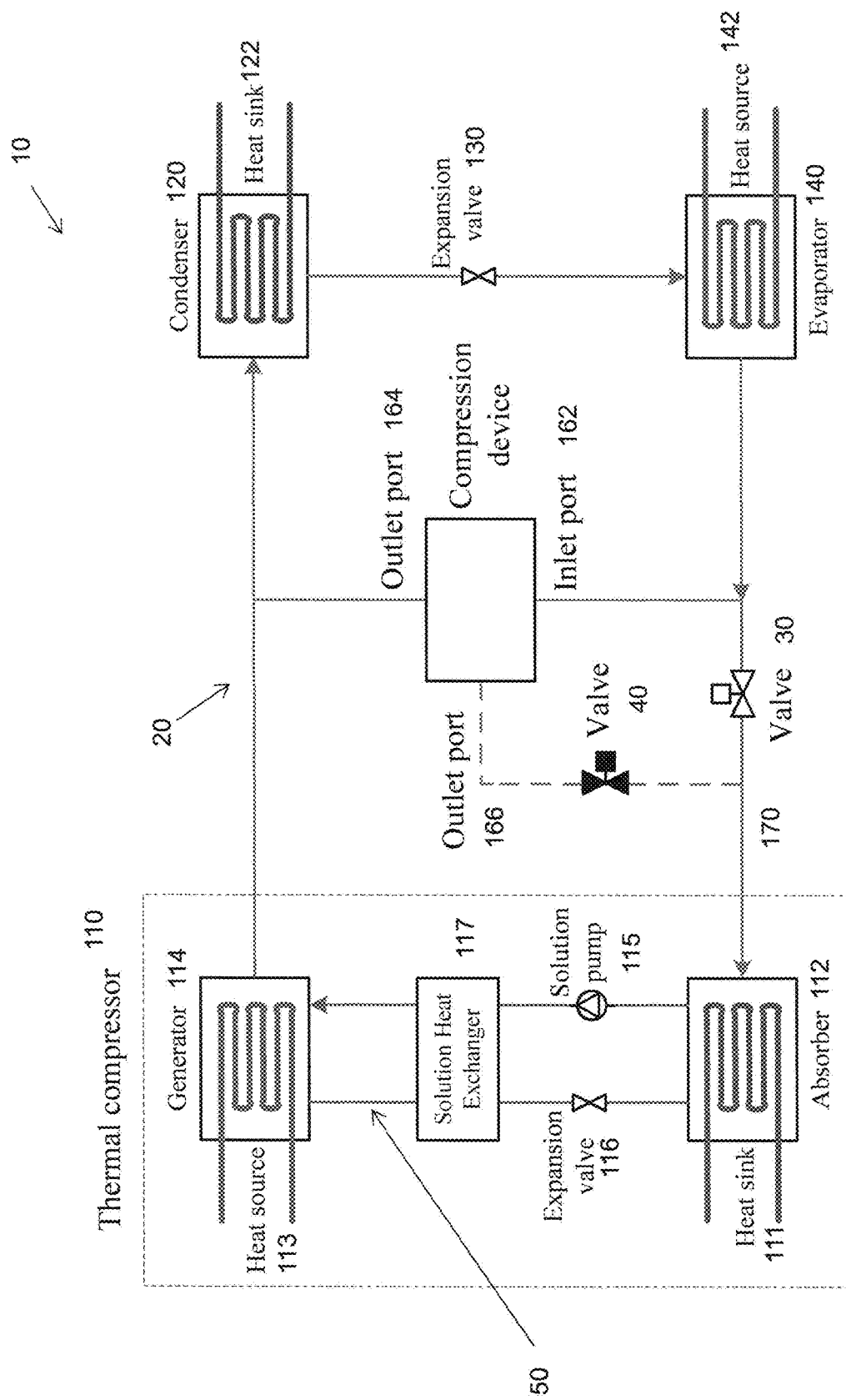
FIG. 6 is a schematic diagram of the hybrid absorption-compression heat pump of FIG. 1 operated in hybrid absorption-compression cycle mode without refrigerant release.

In particular, mode 1 operates as a hybrid heat pump system 10 with refrigerant release when the first valve 30 is closed and the second valve 40 is open (as shown in FIG. 5). Mode 2 operates as a hybrid heat pump system 10 without refrigerant release when the first valve 30 is open and the second valve 40 is closed (as shown in FIG. 6).

Figure 7:
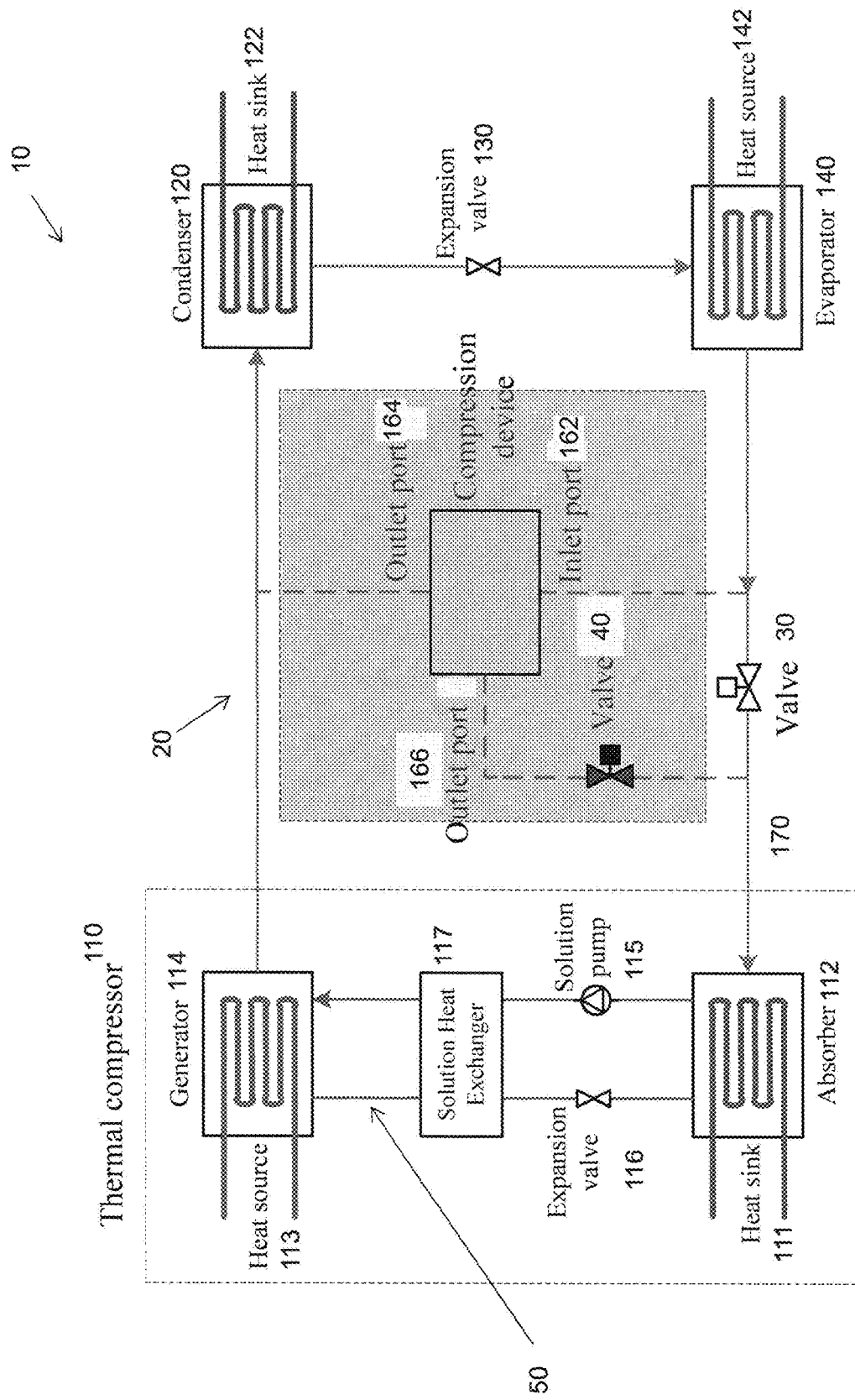
FIG. 7 is a schematic diagram of the hybrid absorption-compression heat pump of FIG. 1 operated in single absorption cycle mode.
Figure 8:
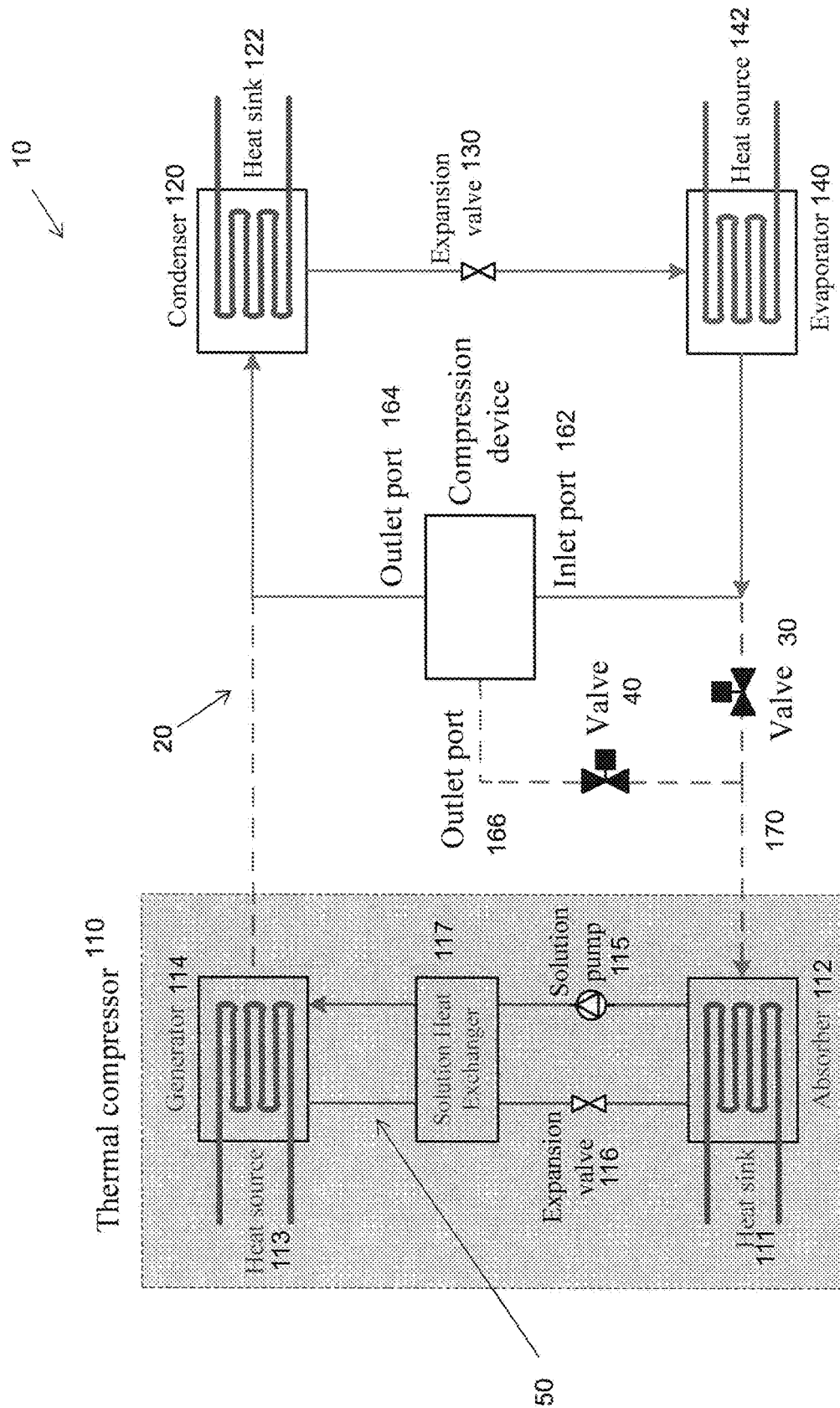
FIG. 8 is a schematic diagram of the hybrid absorption-compression heat pump of FIG. 1 operated in single compression cycle mode.

The first and second valves 30, 40 may also be operated in cooperation with the first and compression means 110 and 150 for operating the system 10 like a conventional absorption or compression cycle. Mode 3 operates as a single absorption cycle mode when the first valve 30 is open, the second valve 40 is closed, and the second compression means 150 is deactivated (as shown in FIG. 7). Mode 4 operates as a single compression cycle mode when the first valve 30 is closed, the second valve 40 is closed, and the first compression means 110 is deactivated (as shown in FIG. 8).

Figure 2:
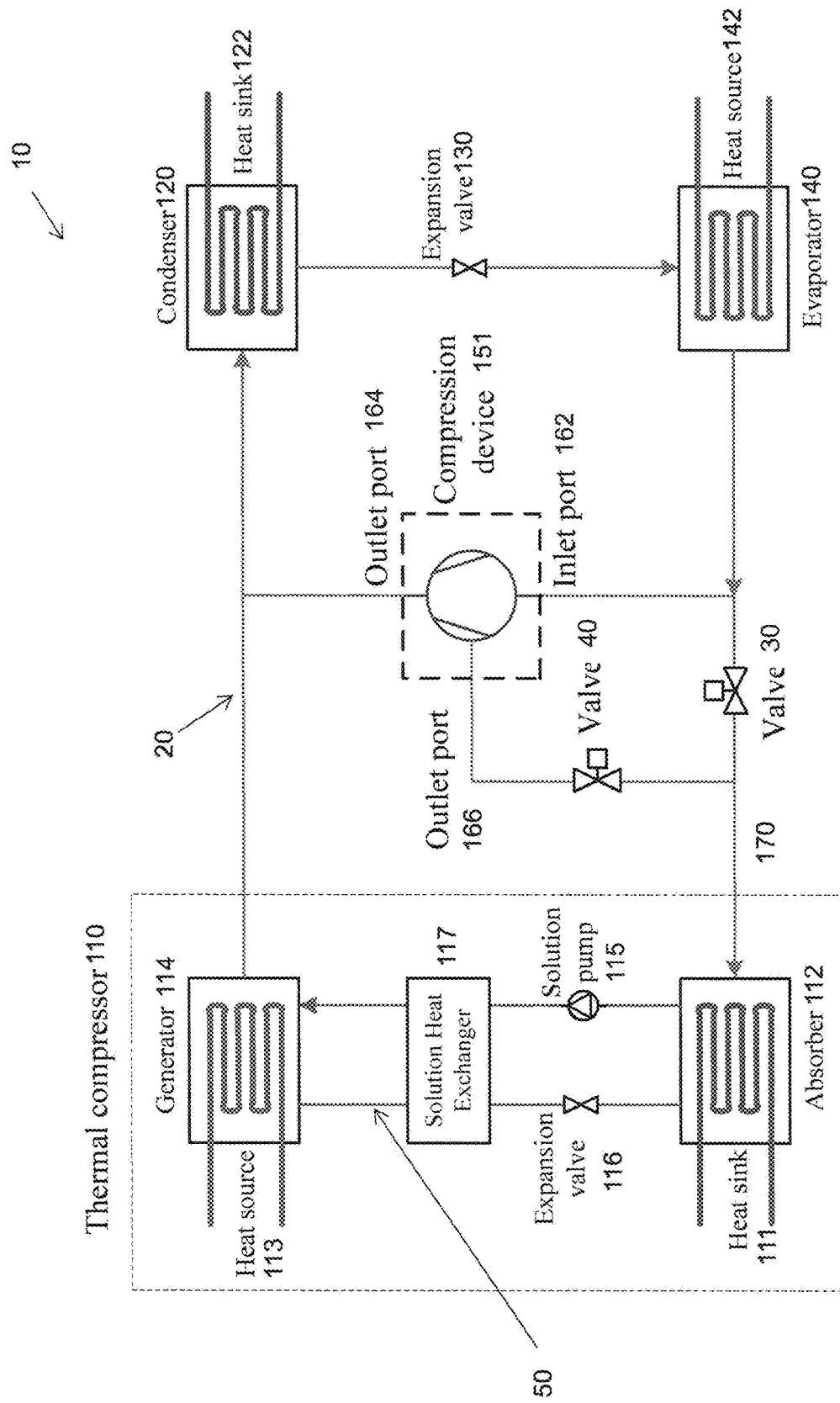
FIG. 2 is a schematic diagram of the hybrid absorption-compression heat pump of FIG. 1 with release-type compressor.
Figure 3:
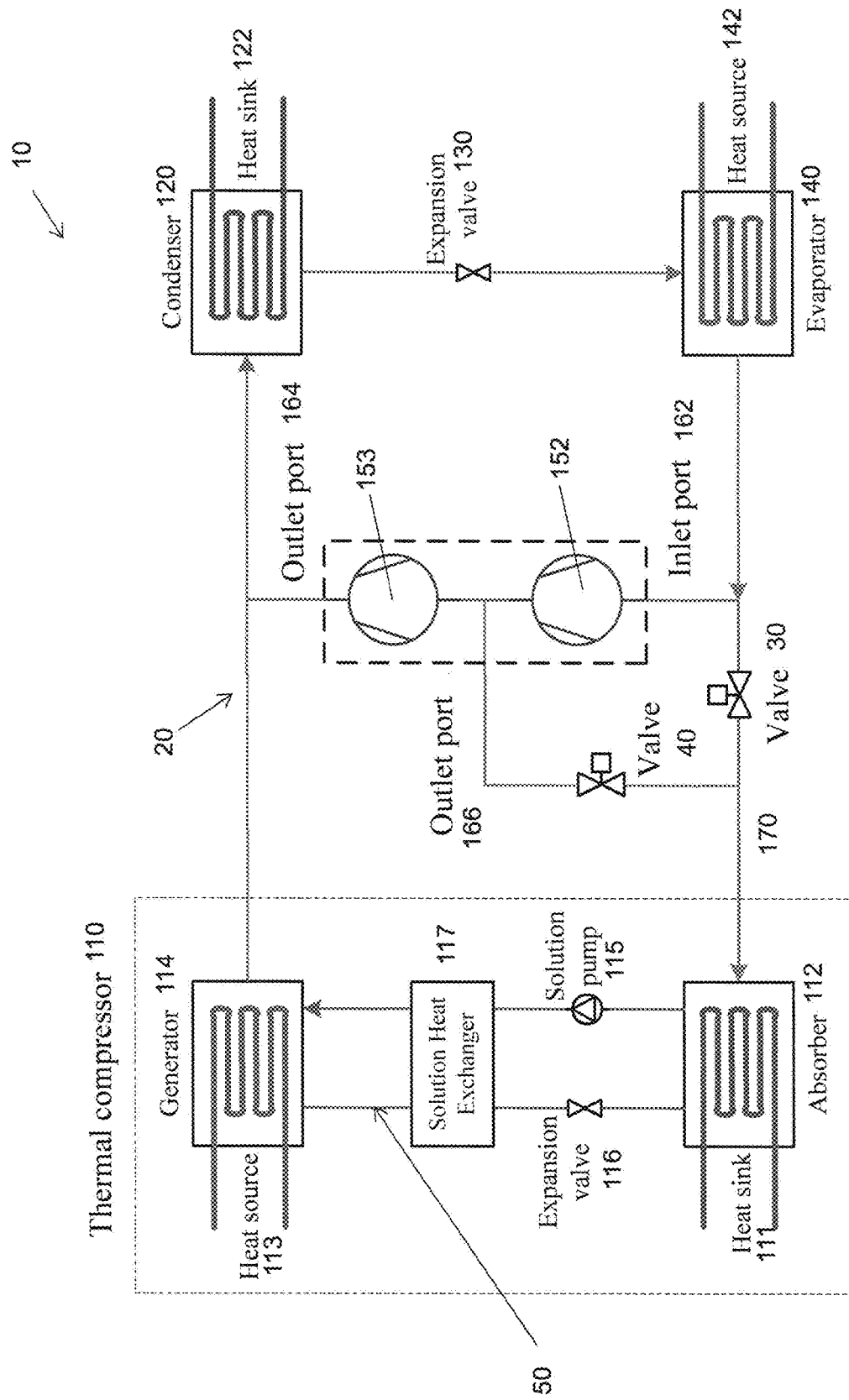
FIG. 3 is a schematic diagram of the hybrid absorption-compression heat pump of FIG. 1 with single-shell two-stage compressor or serially-connected compressors.
Figure 4:
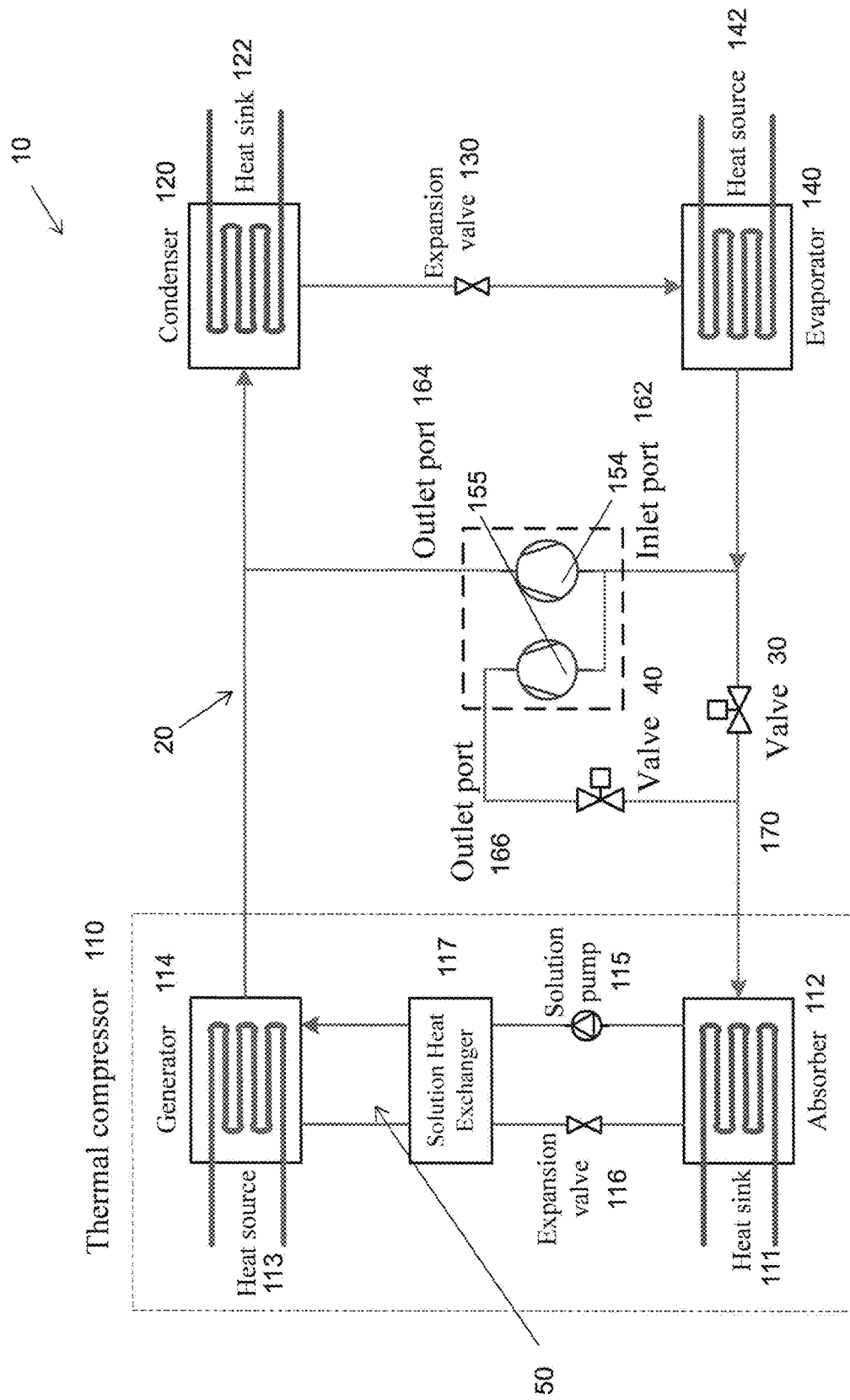
FIG. 4 is a schematic diagram of the hybrid absorption-compression heat pump of FIG. 1 with single-shell dual-cylinder compressor or parallelly-connected compressors.

Preferably, the flow path of the second compression means 150 may be modified for different compressors such as a release-type compressor (as shown in FIG. 2), a single-shell two-stage compressor or a single-shell dual-cylinder compressor (as shown in FIG. 3), and serially-connected compressors or parallelly-connected compressors (as shown in FIG. 4).

In one embodiment as shown in FIG. 2, the second compression means 150 may include a release-type compressor 151 for releasing at least a portion of the refrigerant vapor to the absorber 112 of the first compression means 110 from the second compression means 150 through the second outlet port 166 and the remaining portion of the refrigerant vapor is passed to the condensing means 120 through the first outlet port 164. Preferably, the release-type compressor may be a reciprocating compressor, rolling compressor, scroll compressor, screw compressor, or centrifugal compressor.

In one embodiment as shown in FIG. 3, the second compression means 150 may includes a two-stage compressor, whereby at least a portion of the refrigerant vapor leaving the first stage 152 is released to the absorber 112 of the first compression means 110 and the remaining portion of the refrigerant vapor is passed to the second stage 153 and subsequently the condensing means 120 through the first outlet port 164. Preferably, different stages 152, 153 of the single-shell two-stage compressor may be the same type of compressor such as reciprocating compressor, rolling compressor, scroll compressor, screw compressor, or centrifugal compressor or combinations of different types of compressor.

Alternatively, the second compression means 150 may be embodied as two, first and second serially-connected compressors 152, 153, whereby at least a portion of the refrigerant vapor leaving the first compressor 152 is released to the absorber 112 of the first compression means 110 and the remaining portion of the refrigerant vapor is passed to the second compressor 153 and subsequently the condensing means 120. Preferably, the individual compressors 152, 153 of the serially-connected compressors may be the same type of compressor such as reciprocating compressor, rolling compressor, scroll compressor, screw compressor, or centrifugal compressor or combinations of different types of compressor.

In yet another embodiment as shown in FIG. 4, the second compression means 150 may includes a dual-cylinder compressor 154, 155 for each receiving and compressing a portion of the refrigerant vapor from the evaporator means 140 individually and passing to the absorber 112 of the first compression means 110 and condensing means 120 through the second and first outlet ports 166, 164 respectively. Preferably, different cylinders 154, 155 of the single-shell dual-cylinder compressor may be the same type of compressor such as reciprocating compressor, rolling compressor, scroll compressor, screw compressor, or centrifugal compressor or combinations of different types of compressor.

Alternatively, the second compression means 150 may be embodied as two, first and second parallelly-connected compressors 154, 155 for each receiving and compressing a portion of the refrigerant vapor from the evaporator means 140 individually and passing to the absorber 112 of the first compression means 110 and condensing means 120 through the second and first outlet ports 166, 164 respectively. Preferably, each individual compressor 154, 155 of the parallelly-connected compressors may be the same type of compressor such as reciprocating compressor, rolling compressor, scroll compressor, screw compressor, or centrifugal compressor or combinations of different types of compressor.

In addition, depending on the types of compressors, the compression device 150 can be further extended. For the release-type compressor 151, it could be reciprocating compressor, rolling compressor, scroll compressor, screw compressor, or centrifugal compressor. For the single-shell two-stage compressor or single-shell dual-cylinder compressor 152, 153, and serially-connected compressors or parallelly-connected compressors 154, 155, different stages, different cylinders or different individual compressors can be the same type of compressor such as reciprocating compressor, rolling compressor, scroll compressor, screw compressor, or centrifugal compressor or combinations of different types of compressor.

Referring now to FIG. 5 for the detailed description of the hybrid absorption-compression heat pump 10 operated in hybrid absorption-compression cycle mode with refrigerant release. In this combined absorption-compression mode, the design proportions of the compression sub-cycle and the absorption sub-cycle can be adjusted to accommodate the supply-side capacity profiles and demand-side load profiles, to maximiz primary energy efficiencies, to minimize heat pump oversizing, or to reach annual rejection-and-extraction heat balance. When the driving source temperature of heat source 113 is not high enough or the evaporating temperature is low, this mode can be activated by closing the first valve 30. The refrigerant vapor leaving the evaporator means 140 is received and pressurized by the second compression means 150, and a portion of the refrigerant vapor and another portion of the refrigerant vapor are each subsequently received by the condensing means 120 and the absorber 112 of the first compression means 110 through the first and second outlet ports 164, 166 respectively.

Referring to FIG. 6 for the detailed description of the hybrid absorption-compression heat pump 10 operated in hybrid absorption-compression cycle mode without refrigerant release. When the driving source temperature of heat source 113 is high enough or the evaporating temperature is high, this mode can be activated by closing second valve 40. Meanwhile, the second compression means 150 is adjusted due to the closing of second outlet port 166. A portion of the refrigerant vapor leaving the evaporator means 140 is received through the inlet port 164 and pressurized by the second compression means 150 and subsequently received and condensed by the condensing means 120, and another portion of the refrigerant vapor leaving the evaporator means 140 is received by the absorber 112 of the first compression means 110 directly.

Referring to FIG. 7 for the detailed description of the hybrid absorption-compression heat pump 10 operated in single absorption cycle mode i.e. single absorption mode with the compression sub-cycle bypassed. This mode can be used when the electrical energy or mechanical energy is not available or not preferred. To activate this mode, the first compression means 110 is activated and the second compression means 150 is deactivated, whereby the refrigerant vapor leaving the evaporator means 140 is received by the absorber 112 of the first compression means 110 directly and subsequently received from the generator 114 of the first compression means 110 and condensed by the condensing means 120.

Referring finally to FIG. 8 for the detailed description of the hybrid absorption-compression heat pump 10 operated in single compression cycle mode i.e. isingle compression mode with the absorption sub-cycle bypassed. This mode can be used when the thermal energy from renewable energy source such as solar source, geothermal source, waste source, fossil fuel, etc. is not available or not preferred with the system powered by electricity from the grid or by mechanical energy from the fuel engine. To activate this mode, the first compression means 110 is deactivated and the second compression means 150 is activated, whereby the refrigerant vapor leaving the evaporator means 140 is received through the inlet port 162 and pressurized by the second compression means 150 and subsequently received through the first outlet port 164 and condensed by the condensing means 120.

Overall, the invention provides a very flexible heat pump technology, which can operate at the most efficient mode depending on the actual conditions. Also, the mid-pressure refrigerant release at the second outlet port 166 can greatly decrease the required driving temperature by strengthening the absorption process with increased absorbing pressure while maintaining the same evaporating pressure. This is of great significance to make use of lower-temperature heat sources 113 that otherwise could not be used or had to be used with lower efficiencies. A substantially more renewable energy and waste heat can be efficiently utilized as the driving source of heat pump cycles.

The widely used electrically-driven vapor-compression heat pump and the thermally-driven heat pump have their advantages and disadvantages. The hybrid absorption-compression heat pump with refrigerant release can strengthen the advantages and cancel the disadvantages with a compact configuration.

The refrigerant release provides low-pressure compression between the evaporator 140 and the absorber 112 to strengthen the absorption process of the absorption sub-cycle. The release port 166 determines the pressure lift and can be optimized under various working conditions.

Advantageously, the pressure boosting at the low-pressure side of the absorption sub-cycle is not provided by an additional independent compressor but provided by the refrigerant-release function of the compression device 150 of the compression sub-cycle.

In addition, this invention can also be used for cooling applications with lower cooling temperatures or in hotter climates, as well as for heating applications with higher heating temperatures or in colder climates.

This invention can be used for electrically-thermally-driven heat pumps under various application scenarios for building and industrial energy saving.

It can be well used for hybrid-energy heat pumps for peak-load shaving of the electrical power grid, for waste heat recovery from lower-temperature energy sources, for lower-temperature geothermal energy sources, for lower-temperature solar energy and thus higher solar collecting efficiency.

It can be well used for photovoltaic/thermal heat pumps to increase the overall solar energy efficiency and thus reduce the solar panel installation area.

It can also be used for gas-fired hybrid heat pumps to improve the overall energy efficiency by deep heat recovery from the exhaust flue gas.

It will be appreciated by persons skilled in the art that numerous variations and/or modifications may be made to the present invention as shown in the specific embodiments without departing from the spirit or scope of the invention as broadly described. The present embodiments are, therefore, to be considered in all respects as illustrative and not restrictive.

It will also be appreciated by persons skilled in the art that the present invention may also include further additional modifications made to the hybrid heat pump system which does not affect the overall functioning of the hybrid heat pump system.

Any reference to prior art contained herein is not to be taken as an admission that the information is common general knowledge, unless otherwise indicated. It is to be understood that, if any prior art information is referred to herein, such reference does not constitute an admission that the information forms a part of the common general knowledge in the art, any other country.

The invention claimed is:

1. A hybrid heat pump system comprising:
    first compression means operable to form a refrigerant in vapor form and increases the pressure of the refrigerant vapor;
    condensing means arranged to receive the pressurized vapor and condenses the vapor under pressure to a liquid;
    pressure reduction means through which the liquid refrigerant leaving the condensing means passes to reduce the pressure of the liquid to form a mixture of liquid and vapor refrigerant;
    evaporator means arranged to receive the mixture of liquid and vapor refrigerant that passes through the pressure reduction means to evaporate the remaining liquid to form additional refrigerant vapor;
    second compression means including first and second parallelly-connected compressors, an inlet port, a first outlet port, and a second outlet port, the second compression means being operable to:
        receive, by each of the first and second parallelly-connected compressors, the refrigerant vapor from the evaporator means through the inlet port;
        increase the pressure thereof; and
        pass a portion of the refrigerant vapor from the first compressor to the condensing means through the first outlet port;
        pass another portion of the refrigerant vapor from the second compressor to the first compression means through the second outlet port; and
    a conduit operable to pass at least one of the refrigerant vapor leaving the evaporator means and the refrigerant vapor leaving the second compression means to the first compression means.

2. The system of claim 1, wherein the pressure at the first outlet port is higher than that at the second outlet port and the inlet port, and the pressure at the second outlet port is higher than that at the inlet port.

3. The system of claim 1, wherein a further portion of the refrigerant vapor leaving the evaporator means is received by the first compression means.

4. The system of claim 1, wherein when the first compression means is activated and the second compression means is deactivated, the refrigerant vapor leaving the evaporator means is received by the first compression means and subsequently received and condensed by the condensing means.

5. The system of claim 1, wherein when the first compression means is deactivated and the second compression means is activated, the refrigerant vapor leaving the evaporator means is received and pressurized by the second compression means and subsequently received and condensed by the condensing means.

6. The system of claim 1, wherein the fluid communication between the evaporator means and the first compression means is manipulated by a first valve and the fluid communication between the first and second compression means is manipulated by a second valve.

7. The system of claim 1, wherein each of the first and second parallelly-connected compressors includes at least one of reciprocating compressor, rolling compressor, scroll compressor, screw compressor, and centrifugal compressor.

8. The system of claim 1, wherein the first compression means further includes:
    an absorber that forms a mixture of a refrigerant and an absorbent; and
    a generator that receives the mixture from the absorber and heats the mixture to separate refrigerant, in vapor form, from the absorbent.

9. The system of claim 8, wherein the pressure of the refrigerant vapor from the evaporator means is increased by the second compression means, thereby increasing the absorption pressure at the absorber of the first compression means.

* * * * *